US011215533B2

(12) United States Patent
Okamoto et al.

(10) Patent No.: US 11,215,533 B2
(45) Date of Patent: Jan. 4, 2022

(54) LOAD MOTOR FOR CHASSIS DYNAMOMETER APPARATUS

(71) Applicant: TOYO DENKI SEIZO KABUSHIKI KAISHA, Tokyo (JP)

(72) Inventors: Yoshihiro Okamoto, Kanagawa (JP); Yuta Funaki, Shiga (JP)

(73) Assignee: TOYO DENKI SEIZO KABUSHIKI KAISHA, Tokyo (JP)

( * ) Notice: Subject to any disclaimer, the term of this patent is extended or adjusted under 35 U.S.C. 154(b) by 137 days.

(21) Appl. No.: 16/641,051

(22) PCT Filed: May 10, 2018

(86) PCT No.: PCT/JP2018/018071
§ 371 (c)(1),
(2) Date: Feb. 21, 2020

(87) PCT Pub. No.: WO2019/053940
PCT Pub. Date: Mar. 21, 2019

(65) Prior Publication Data
US 2021/0048372 A1 Feb. 18, 2021

(30) Foreign Application Priority Data
Sep. 15, 2017 (JP) .............................. JP2017-178352

(51) Int. Cl.
*G01M 17/007* (2006.01)
*H02K 11/24* (2016.01)
(Continued)

(52) U.S. Cl.
CPC ............. *G01M 17/007* (2013.01); *G01L 3/22* (2013.01); *H02K 7/14* (2013.01); *H02K 11/24* (2016.01)

(58) Field of Classification Search
CPC ....... G01M 17/007; H02K 11/24; H02K 7/14; G01L 3/22
See application file for complete search history.

(56) References Cited

U.S. PATENT DOCUMENTS 4,669,318 A 6/1987 Angstrom
5,323,644 A 6/1994 Schaefer
(Continued)

FOREIGN PATENT DOCUMENTS

JP 64-33645 U 3/1989
JP 5-58129 B2 8/1993
(Continued)

OTHER PUBLICATIONS

International Search Report and Written Opinion for PCT Patent App. No. PCT/JP2018/018071 (dated Jul. 31, 2018) with English translation of the ISR.

*Primary Examiner* — Freddie Kirkland, III
(74) *Attorney, Agent, or Firm* — Cermak Nakajima & McGowan LLP; Tomoko Nakajima

(57) ABSTRACT

A case having a stator fixed to an inside surface of a peripheral wall portion can be inserted into a tire house of a vehicle from an outside o in an axial direction. An inside of a hollow portion of the case can receive, by insertion thereinto, a brake disc and a brake caliper of the vehicle. A rotor includes: a rotor coupling portion that can be coupled to a drive wheel coupling portion of the vehicle; a rotor frame extending outside in a radial direction at an axially outer position than the brake caliper in a state in which the rotor coupling portion is coupled to the drive wheel coupling portion; a rotor circumferential wall portion connected to a radially outside end of the rotor frame, and extending axially inside from a connecting portion with the radially outside end; and a magnet fixed to the rotor circumferential wall portion.

5 Claims, 6 Drawing Sheets

(51) Int. Cl.
*G01L 3/22* (2006.01)
*H02K 7/14* (2006.01)

(56) References Cited

U.S. PATENT DOCUMENTS

| | | | | |
|---|---|---|---|---|
| 8,387,449 | B2 * | 3/2013 | Engstrom | G01M 15/044 |
| | | | | 73/116.05 |
| 9,109,973 | B2 * | 8/2015 | Inhoff | B66F 9/148 |
| 9,360,395 | B2 * | 6/2016 | Engstrom | G01M 17/007 |
| 9,752,961 | B2 * | 9/2017 | Barnes | G01M 17/0074 |
| 9,893,673 | B2 * | 2/2018 | Engstrom | H02K 15/125 |
| 10,444,119 | B2 * | 10/2019 | Engstrom | G01M 17/007 |
| 10,564,058 | B2 * | 2/2020 | Kiuchi | G01L 3/16 |
| 10,739,234 | B2 * | 8/2020 | Engstrom | G01L 3/20 |
| 2010/0107750 | A1 | 5/2010 | Engstroem | |
| 2021/0167659 | A1 * | 6/2021 | Myouki | H02K 11/25 |
| 2021/0215573 | A1 * | 7/2021 | Seto | G01M 17/0074 |

FOREIGN PATENT DOCUMENTS

| | | |
|---|---|---|
| JP | 3073110 B2 | 8/2000 |
| JP | 2004-020401 A | 1/2004 |

\* cited by examiner

LOAD MOTOR FOR CHASSIS DYNAMOMETER APPARATUS

This application is a national phase entry under 35 U.S.C. § 371 of PCT Patent Application No. PCT/JP2018/018071, filed on May 10, 2018, which claims priority under 35 U.S.C. § 119 to Japanese Patent Application No. 2017-178352, filed Sep. 15, 2017, both of which are incorporated by reference.

TECHNICAL FIELD

The present invention relates to a load motor for a chassis dynamometer apparatus which carries out a performance test of a vehicle.

BACKGROUND ART

The prior-art chassis dynamometer apparatus is provided with: a load motor whose rotor shaft is combined with a drive wheel of a vehicle in a manner not rotatable relative to each other; a wheel contact roller rotatably supported by an apparatus frame; and a compensating motor whose rotor shaft is fixed to an axle of the wheel contact roller in a manner not rotatable relative to each other (see, for example, Patent Document 1). In the above-mentioned load motor, the rotor shaft has coupled thereto a countershaft that extends outside beyond a case. A flange portion at a front end of the countershaft is fixed to a hub portion of the drive wheel through a spacer by means of bolts. At the time of a performance test, electric current that flows to the load motor and frequency are controlled so that actual load, i.e., mechanical load is applied. Then, each value of a vehicle speed signal, a front-rear load change, a torque change, an amount of movement in the center of gravity, etc. as detected by the measurement apparatus that is equipped with a rotary encoder, a resolver, a pressure sensor, an acceleration sensor, etc. is inputted into an operation section of a control system on a real time basis.

Among the chassis dynamometer apparatuses, there have been developed some in which the flange portion at the front end of the countershaft that extends outside beyond the case of the load motor is coupled to the drive wheel coupling portion in a state in which a drive wheel has been removed out of the drive wheel coupling portion of the vehicle, thereby omitting the above-mentioned wheel contact roller. The load motor of this chassis dynamometer apparatus overhangs outside largely beyond the vehicle body in the same manner as in the load motor disposed in the above-mentioned prior-art chassis dynamometer apparatus.

Recently, in order to improve the driving safety of the vehicle, various kinds of systems have been developed such as a collision avoidance braking system, a traffic movement notification system, a traffic sign recognition system, an unintended starting-out prevention system, a vehicular gap maintenance assisting system, a lane maintenance assisting system, off-road restraining system, etc., and various sensors are disposed on the vehicle body. When the load motor that overhangs largely outside beyond the vehicle body is used with this kind of vehicle, the load motor will wrongly be detected by the sensors as an obstacle, sometimes resulting in wrong operation of the vehicle. In particular, in an automated drive vehicle now scheduled to put into practical use in the near future, there will have to be disposed by far a larger number of sensors. Therefore, solution to the wrong operation of the vehicle due to the wrong detection by the load motor is an urgent matter to be attended to.

PRIOR ART DOCUMENTS

Patent Documents

Patent Document 1: JP2004-20401A

SUMMARY OF THE INVENTION

Problems that the Invention is to Solve

In view of the above points, this invention has a problem of providing a load motor for a chassis dynamometer apparatus in which the wrong operation of a vehicle due to wrong detection can be restrained and in which a highly reliable performance test of the vehicle becomes possible.

Means for Solving the Problems

In order to solve the above-mentioned problem, this invention provides a load motor for a chassis dynamometer apparatus which carries out a performance test of a vehicle. The load motor comprises: a case having a peripheral wall portion, an end wall portion, and a hollow portion enclosed by the peripheral wall portion and the end wall portion; a stator fixed to a radially inside surface of the peripheral wall portion; and a rotor which is housed inside the hollow portion of the case, which is rotatably disposed radially inside the stator, and which can be coupled to a drive wheel coupling portion of the vehicle. Provided that a vehicle width direction is defined as an axial direction, that an outside of the vehicle width direction is defined as an axial outside, and that an inside of the vehicle width direction is defined as an axial inside, the peripheral wall portion of the case extends in the axial direction; the end wall portion of the case is disposed at an axial outside end of the peripheral wall portion; the case can be inserted from the axial outside into a tire house of the vehicle at the time of mounting in position the load motor for a chassis dynamometer apparatus; and the hollow portion of the case can receive, by insertion thereinto, a brake disc and a brake caliper of the vehicle. The rotor has: a rotor coupling portion which can be coupled to the drive wheel coupling portion of the vehicle; a rotor frame extending radially outside at an axially outer position than the brake caliper in a state in which the rotor coupling portion is coupled to the drive wheel coupling portion; a rotor circumferential wall portion which is connected to a radially outside end of the rotor frame and which extends axially inside from a connecting portion connected to the radially outside end of the rotor frame; and a magnet fixed to the rotor circumferential wall portion. It is thus so arranged that the brake caliper is inserted into a space radially inside the rotor circumferential wall portion in a state in which the rotor coupling portion is kept coupled to the drive wheel coupling portion.

According to this invention, since it is so arranged that the brake caliper is inserted into the space radially inside the rotor circumferential wall portion in a state in which the rotor coupling portion is kept coupled to the drive wheel coupling portion, the distance in the axial direction between the rotor frame and the brake caliper can be shortened, and the distance in the axial direction between the rotor coupling portion and the end wall portion of the case can also be shortened. As a consequence, in a state in which the rotor coupling portion is kept coupled to the drive wheel coupling portion of the vehicle, the end wall portion of the case can be restrained from largely overhanging outside of the tire house of the vehicle. As a result, various kinds of sensors disposed on the vehicle can be restrained from wrongly detecting the load motor for the chassis dynamometer apparatus. It therefore becomes possible to restrain the wrong operation of the vehicle due to the wrong detection. A highly reliable performance test of the vehicle can thus be made feasible.

In this invention, the rotor coupling portion shall preferably be disposed integrally with the rotor frame, and the rotor frame extends from the rotor coupling portion by offsetting axially outside so as to extend radially outside in a manner to detour the brake caliper. Alternatively, preferably an axle member that is a member separate from the rotor frame is provided with the rotor, and the axle member has a rotor coupling portion axially inside so that the rotor frame is coupled to the axle member at the radially inside end portion of the rotor frame.

Furthermore, in this invention, a torque sensor shall preferably be disposed on the rotor frame. According to this arrangement, the load motor for a chassis dynamometer apparatus will be in the form in which the torque sensor for detecting the torque to be applied to the axle is housed inside. Since the torque sensor can be refrained from protruding outside in the vehicle width direction, the wrong detection by the various sensors that are disposed on the vehicle can further be restrained.

MODES FOR CARRYING OUT THE INVENTION

Figure 1:
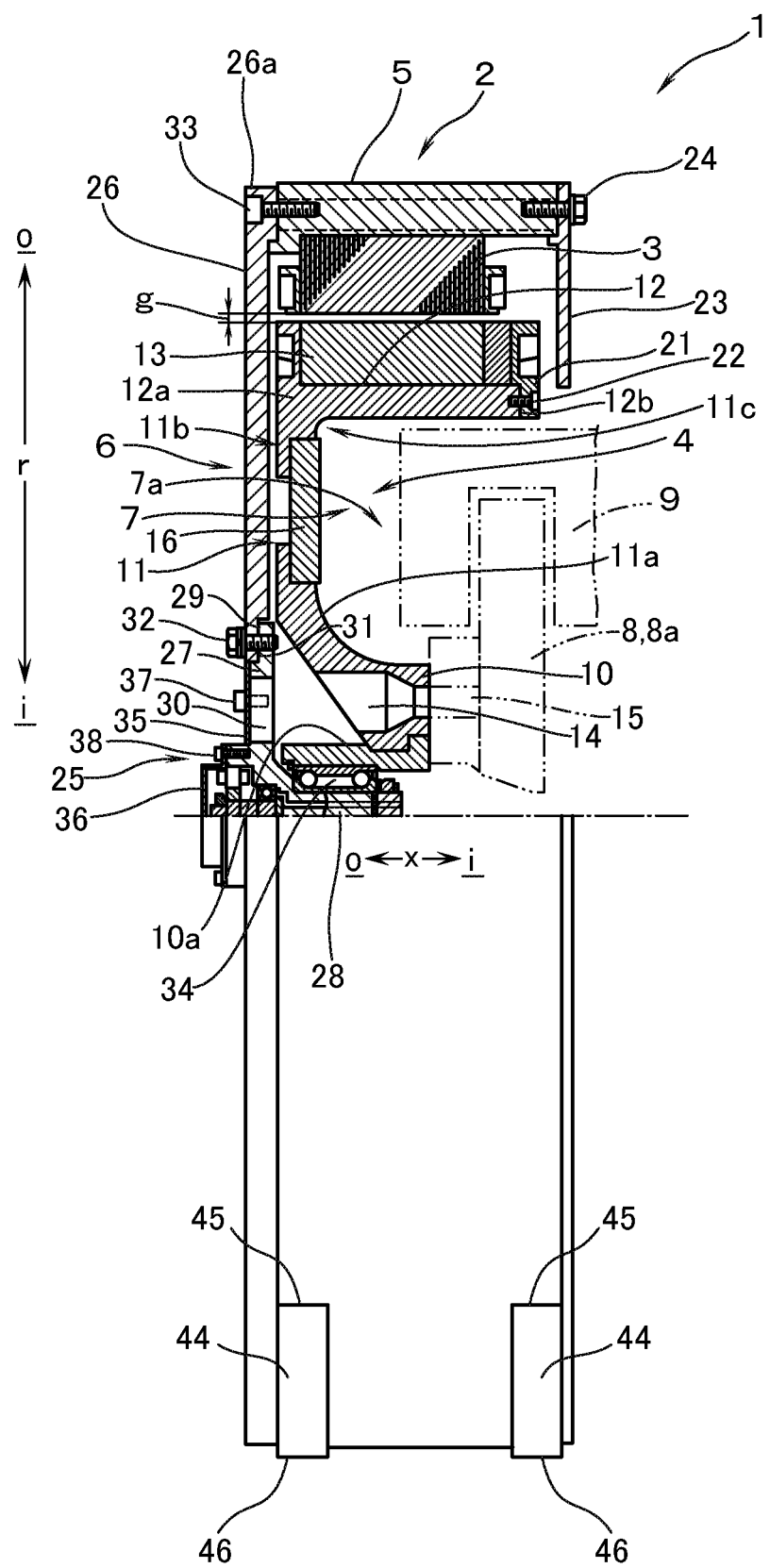
FIG. 1 is a sectional view, as seen from a side, of an essential part showing a first embodiment of a load motor for a chassis dynamometer apparatus.
Figure 2:
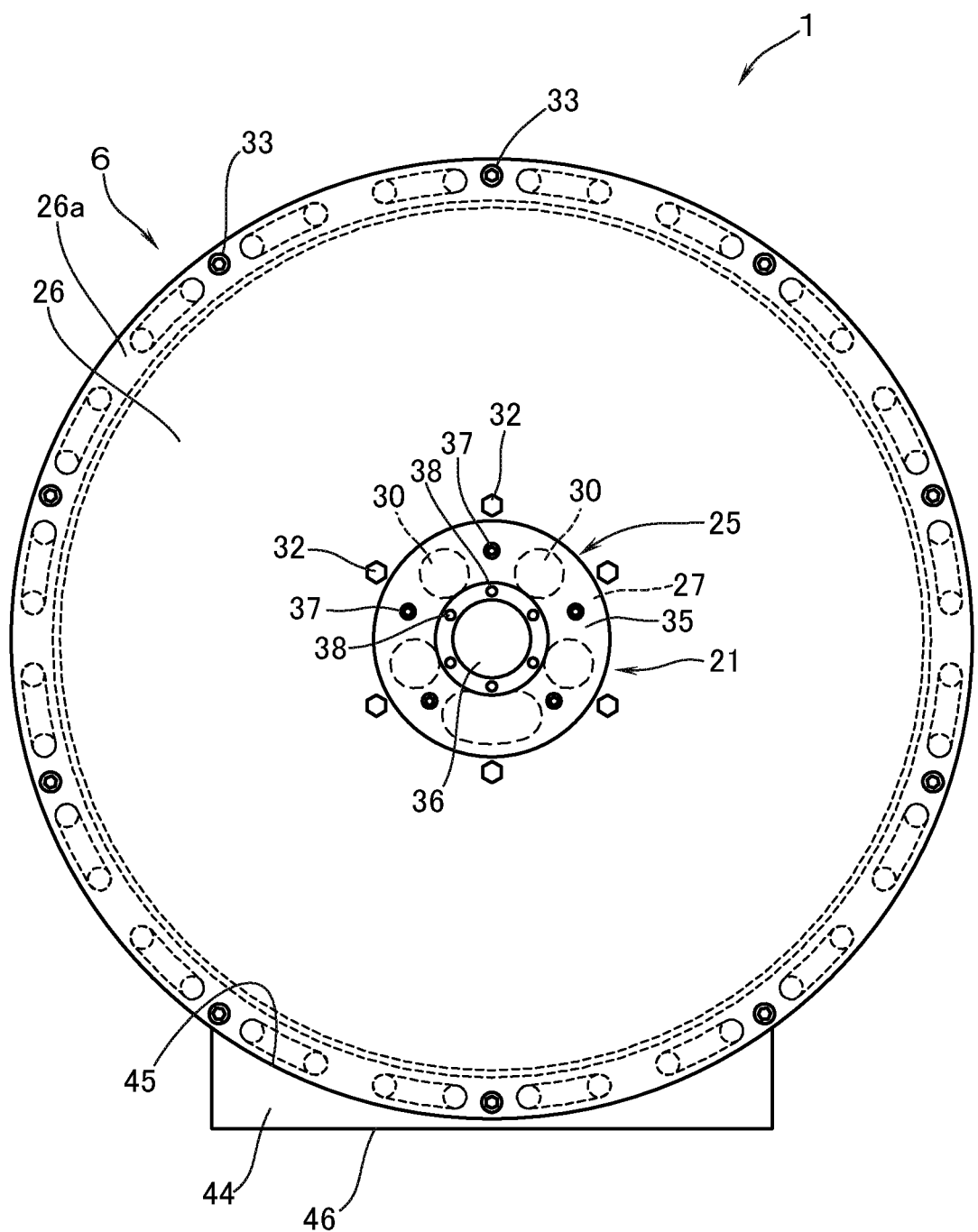
FIG. 2 is a view taken from an axially outside of the first embodiment shown in FIG. 1.

With reference to FIG. 1 and FIG. 2, a description will be made of a load motor for a chassis dynamometer apparatus (hereinafter simplified as a load motor) according to a first embodiment of this invention. The load motor 1 is provided with the chassis dynamometer apparatus which carries out a performance test of a vehicle, and can be attached to a drive wheel coupling portion 8 that is disposed at an end of an axle of the vehicle. Although varying with the structure of the suspension system of the vehicle, the drive wheel coupling portion 8 is a member including a brake disc 8a, a wheel hub and the like. The load motor 1 is provided with a case 2, a stator 3, and a rotor 4.

In the following description, the radial direction is defined as r, and its outside is defined as o, and the inside thereof as i, respectively. Further, the direction of the vehicle width is defined as an axial direction x, the vehicle-width outside is defined as outside o in the axial direction x, and the vehicle-width inside is defined as inside i in the axial direction x. The case 2 has a peripheral wall portion 5, an end wall portion 6, and a hollow portion 7 that is enclosed by the peripheral wall portion 5 and the end wall portion 6. The peripheral wall portion 5 extends in the axial direction x and may take a cylindrical shape and the like. The end wall portion 6 is disposed at the outside end in the axial direction x of the peripheral wall portion 5. The details of the end wall portion 6 will be described hereinafter.

The stator 3 is fixed to the inside surface of the peripheral wall portion 5 of the case 2. The stator 3 has a coil that is wound therearound so that electric power supply is possible from the chassis dynamometer apparatus. The rotor 4 is housed inside the hollow portion 7 of the case 2 and is rotatably disposed inside i in the radial direction r of the stator 3. The rotor 4 can be coupled to the drive wheel coupling portion 8 of the vehicle.

The case 2 can be inserted into a tire house from outside o in the axial direction x at the time of installing the load motor 1, as described hereinafter. At the time of inserting, a brake disc 8a and a brake caliper 9 that are included in the drive wheel coupling portion 8 of the vehicle are inserted into the inside of the hollow portion 7.

The rotor 4 is provided with: a rotor coupling portion 10; a rotor frame 11; a rotor circumferential wall portion 12; and a magnet 13. The rotor coupling portion 10 is a member which is responsible for the coupling to the drive wheel coupling portion 8 of the vehicle. In the first embodiment, the rotor coupling portion 10 has fixed thereto, at an inside end in the radial direction r, a tubular axle 10a of a cylindrical shape. The tubular axle 10a extends outside o from the inside end in the axial direction x of the rotor coupling portion 10. In addition, the rotor coupling portion 10 has opened therethrough a plurality of first through holes 14 that penetrate through in the axial direction x. The first through holes 14 are capable of inserting therethrough fixing tools such as bolts and the like, and are arranged coaxially at a predetermined distance from one another. Further, the first through holes 14 are capable of facing in a one-to-one positional relationship with a plurality of threaded holes 15 that are opened by passing through the drive wheel coupling portion 8 in the vehicle width direction. Still furthermore, the hole diameters of the first through holes 14 are not uniform, but are made larger at the outside o in the axial direction x than the hole diameters at the inside i in the axial direction x. The maximum outside hole diameter enables to insert the fixing tools for coupling the rotor coupling portion 10 to the drive wheel coupling portion 8 by using fixing tools such as bolts and the like. The minimum outside hole diameter enables to insert the portion other than the head portion of the fixing tools such as bolts and the like. In the first embodiment, the rotor coupling portion 10 is arranged to be integral with the rotor frame 11.

Figure 3:
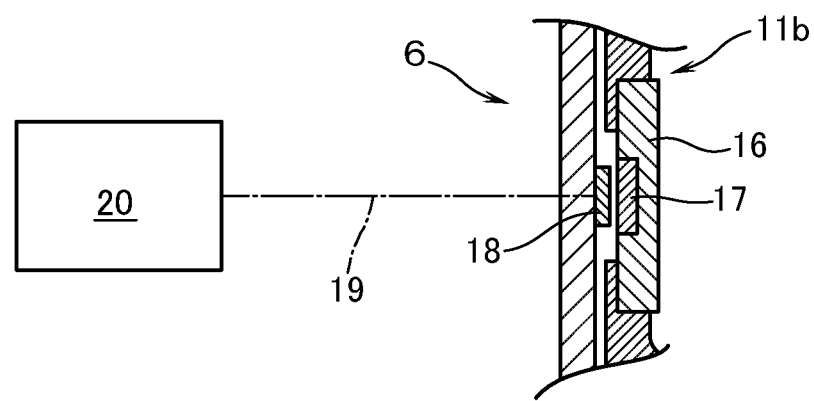
FIG. 3 is an enlarged sectional view of an essential part of a torque sensor disposed on a rotor frame of the first embodiment shown in FIG. 1.

The rotor frame 11 extends outside o in the radial direction r in a more outside position in the axial direction x than the brake caliper 9, in a state in which the rotor coupling portion 10 is kept coupled to the drive wheel coupling portion 8. In the first embodiment, the rotor frame 11 extends outside o in the axial direction x by offsetting outside o in the axial direction x, from the rotor coupling portion 10 in a manner to detour the brake caliper 9. Specifically, the rotor frame 11 is provided with: a detouring portion 11a which offsets outside o in the axial direction x from the rotor coupling portion 10 by detouring the brake caliper 9; and a ring shaped upright portion 11b that is separate from the detouring portion 11a and that extends straight outside o in the radial direction r. As a result of offsetting of the detouring portion 11*a*, the rotor frame 11 is arranged to be out of contact with the brake caliper 9 without interfering with each other. Accordingly, there is no need of removing the brake caliper 9 out of the vehicle body at the time of mounting in position the load motor 1. In addition, in the rotor frame 11 the upright portion 11*b* is disposed while maintaining a clearance in the radial direction r relative to the detouring portion 11*a*, and a torque sensor 16 is disposed between the detouring portion 11*a* and the upright portion 11*b*. The torque sensor 16 is a sensor to measure the torque to be applied to the axle. For example, there may be employed a non-contact type in which the torque is measured in a non-contact manner by utilizing the magnetostrictive effect. In this case, as shown in FIG. 3, the torque sensor 16 may be provided with a transmitter 17 on a side that lies opposite to the end wall portion 6. The transmitter 17 may be provided, e.g., with a strain gauge, a converter which converts an output signal of the strain gauge into voltage, and an antenna which transmits the obtained voltage signal. The strain gauge may be adhered to such a counterbored portion that is formed, at a predetermined distance to one another, in such a side of the torque sensor 16 as is lying opposite to the end wall portion 6. Further, the strain gauge may similarly be disposed at the upright portion 11*b* in such a portion as is lying opposite to the end wall portion 6. The antenna may be disposed on such a surface of the torque sensor 16 as is lying opposite to the end wall portion 6.

In case the transmitter 17 is disposed on the torque sensor 16 as described above, a receiver 18 for receiving the transmitted signal from the antenna can be disposed on that inside end surface in the axial direction x of the end wall portion 6 which lies opposite to the transmitter 17. As the receiver 18, use may be made of a loop antenna system, a pickup system, and the like. The receiver 18 of any of the systems will be protruded from the inside end surface in the axial direction x of the end wall portion 6 into the inside i in the axial direction x. Therefore, in order for the torque sensor 16 not to come into contact with the detouring portion 11*a* and the upright portion 11*b*, the torque sensor 16 is disposed on the inside portion in the axial direction x of the detouring portion 11*a* and the upright portion 11*b*. As shown in FIG. 3, the receiver 18 can be connected, through an electric cable 19, to an evaluation unit 20 of the chassis dynamometer apparatus. It becomes possible to perform analysis and the like of the torque by inputting into the evaluation unit 20 the signals as received by the receiver 18.

The rotor circumferential wall portion 12 is connected to an outside end in the radial direction r of the rotor frame 11, and extends from the connecting portion 11*c* with the outside end in the radial direction r of the rotor frame 11 toward the inside i in the axial direction x. In the first embodiment, the rotor circumferential wall portion 12 is connected to the outside end in the radial direction r of the upright portion 11*b* of the rotor frame 11, the shape of the rotor circumferential wall portion being of a cylindrical shape extending from the connecting portion 11*c* inside i in the axial direction x. Therefore, in a state in which the rotor coupling portion 10 has been coupled to the drive wheel coupling portion 8, the brake caliper 9 is inserted, within the hollow portion 7, into a space 7*a* in the inside i as seen in the radial direction r of the rotor circumferential wall portion 12. As a result, the distance in the axial direction x between the rotor frame 11 and the brake caliper 9 can be shortened so that the distance in the axial direction x between the rotor coupling portion 10 and the end wall portion 6 of the case 2 can also be shortened. Therefore, in a state in which the rotor coupling portion 10 has been coupled to the drive wheel coupling portion 8, the end wall portion 6 of the case 2 can be restrained from largely overhanging outside of the tire house of the vehicle. By the way, in the first embodiment, the position in the outside end portion 12*a* in the axial direction x of the rotor circumferential wall portion 12 is right close to the inside end in the axial direction x of the end wall portion 6, and is free from contact with the inside end surface in the axial direction x of the end wall portion 6. Further, the outside end portion 12*a* is bent outside o in the radial direction r. The outside end position at the radial direction r of the outside end portion 12*a* is arranged to lie within a range free from contact with the stator 3.

The magnets 13 are disposed in a plurality of pieces along the circumferential direction of the rotor circumferential wall portion 12 at a predetermined distance from one another, and there is provided a gap g between the outside end surface in the radial direction r of each of the magnets 13 and the inside end surface in the radial direction r of the stator 3. As described above, when the outside end portion 12*a* in the axial direction x of the rotor circumferential wall portion 12 is bent, the outside end position in the radial direction r of the outside end portion 12*a* shall be within a range in which the gap g can be secured. The outside end portion 12*a* can be used for positioning purpose in fixing the magnets 13. In addition, by fixing a fixing member 21, with bolts 22, to the inside end portion 12*b* of the rotor circumferential wall portion 12, the outside end portion 12*a* can hold by pinching the magnets 13 between the outside end portion 12*a* and the fixing member 21.

In the first embodiment, a first cover 23 is attached to an inside end in the axial direction x in the peripheral wall portion 5 of the case 2. By attaching the first cover 23, it becomes possible to restrain the foreign matters and the like from entering the gap g between the stator 3 and the magnets 13 of the rotor 4. The first cover 23 may be made of a ring-shaped member that extends inside i in the radial direction r from the peripheral wall portion 5. In this case, the inside end position in the radial direction r of the first cover 23 shall be within a range free from contact with the brake caliper 9. Further, the first cover 23 is mounted by screwing bolts 24 on an inside end surface in the axial direction x of the peripheral wall portion 5. For this purpose, the inside end surface portion in the axial direction x of the peripheral wall portion 5 has opened therein a plurality of threaded holes at a predetermined spacing from one another on a concentric circle so as to enable to insert the bolts 24 by screwing. On the other hand, the peripheral edge portion of the first cover 23 is provided with through holes at a position that can lie opposite to the above-mentioned through holes on the peripheral wall portion 5, on a concentric circle by penetrating in the axial direction x. By the way, the position of the inside end portion 12*b* in the axial direction x of the rotor circumferential wall portion 12 shall be only up to the inside end in the axial direction x of the case 2 so as to keep the rotor circumferential wall portion out of contact with the first cover 23.

Further, in the first embodiment, the end wall portion 6 is made up of a rotation support portion 25 and a second cover 26. The rotation support portion 25 has: a ring 27 that is positioned in the central portion in the radial direction r of the end wall portion 6 and is disposed at an outside end in the axial direction x; and a stationary axle 28 that extends from the central portion of the inside end surface in the axial direction x of the ring 27 inside i in the axial direction x. An outside end portion in the radial direction x of the ring 27 has formed therein a first counterbored portion 29 formed in the peripheral end portion positioned outside o in the axial direction x. The first counterbored portion 29 has formed therein a plurality of threaded holes that penetrate in the axial direction x on a concentric circle at a predetermined spacing from one another. Further, in a portion of the ring 27 closer to the first counterbored portion 29, there are opened second through holes 30 on a concentric circle by penetrating in the axial direction x in a position capable of lying opposite to the first through holes 14 that are opened in the rotor coupling portion 10. The second through holes 30 are capable of inserting therein fixing tools for coupling the rotor coupling portion 10 to the drive wheel coupling portion 8 using fixing fittings such as bolts and the like. For this reason, the outer diameter of the second through holes 30 are made equal to the maximum hole diameter of the first through holes 14. In addition, the second through holes 30 lie opposite to each other in a one-to-one relationship with the first through holes 14. Therefore, when the rotor coupling portion 10 is coupled to the drive wheel coupling portion 8, the fixing fittings such as bolts and the like and the fixing tools such as a wrench or a screw driver can be inserted into the hollow portion 7 of the case 2. For this reason, the coupling work of coupling the rotor coupling portion 10 and the drive wheel coupling portion 8 of the vehicle using the fixing tools becomes easy.

The second cover 26 is also of a ring-shaped member and is disposed outside o in the radial direction r of the ring 27. In an inside end portion in the radial direction r of the second cover 26, there is formed a second counterbored portion 31 that is positioned inside i in the axial direction x. The second counterbored portion 31 can be joined to the first counterbored portion 29 of the ring 27. In addition, the second counterbored portion 31 has formed therein on a concentric circle a plurality of through holes that can lie opposite to the threaded holes formed in the first counterbored portion 29. On the other hand, at an outside edge portion 26a in the radial direction r of the second cover 26, a plurality of through holes are formed on a concentric circle at a predetermined distance from one another by penetrating in the axial direction x. In a manner to correspond to the through holes that are formed in the outside end portion, there are formed a plurality of threaded holes on a concentric circle in an outside end portion in the axial direction x of the peripheral wall portion 5. The second cover 26 can be fixed to the peripheral wall portion 5 together with the ring 27 by: joining the second counterbored portion 31 to the first counterbored portion 29 from an outside in the axial direction x; and also joining the outside edge portion 26a to the outside end surface in the axial direction x of the peripheral wall portion 5; and inserting the bolts 32, 33 into the above-mentioned inserting holes and into the threaded holes. The end wall portion 6 can thus be formed.

Furthermore, in the first embodiment, the rotor 4 is rotatably supported at the tubular axle 10a by the case 2 through a bearing 34 that is mounted on a circumference of the stationery axle 28. As the bearing 34 there is employed an outer ring rotating type, but it is also possible to employ an inner ring rotating type. Then in the first embodiment, the ring 27 which forms the end wall portion 6 has mounted thereon a ring-shaped third cover 35 and a circular cap 36 which keep out of sight from an outside o of the second through holes 30 and the central portion, respectively. The third cover 35 is fixed by bolts 37 and the circular cap 36 is fixed by screws 38, respectively to the outside end surface in the axial direction x of the ring 27.

Figure 4:
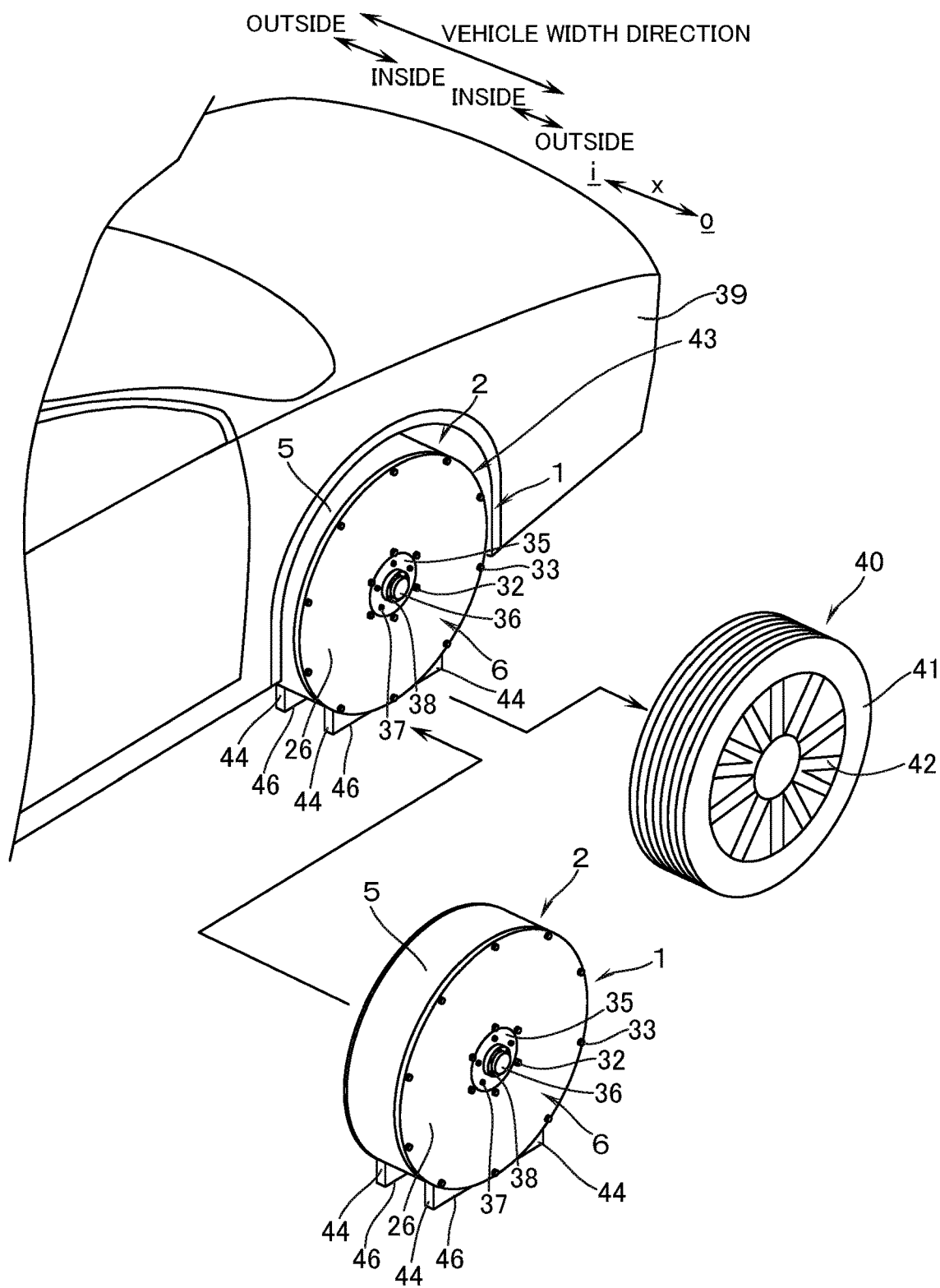
FIG. 4 is a perspective view of an essential part in a case where the first embodiment is mounted on a vehicle.

The load motor 1 according to the first embodiment can be coupled, as shown in FIG. 4, at the time of carrying out a performance test of a vehicle 39, to the drive wheel coupling portion 8 to which is coupled a wheel assembly 40 which corresponds to the drive wheel. The coupling to the drive wheel coupling portion 8 can be made: by two front wheels in case the vehicle 39 is of a front-wheel drive system; by two rear wheels in case of a rear-wheel drive system; and by four wheels in case of a four-wheel drive system. In this case, the wheel assembly 40 of the vehicle 39 is removed together with a wheel 42 having mounted thereon a tire 41. The load motor 1 is then inserted into the tire house 43 of the vehicle 39 from an outside o in the axial direction x. At this time, as described above, since the distance in the axial direction x from the rotor coupling portion 10 to the end wall portion 6 has been shortened, it may also be possible to dispose the end wall portion 6 on the same plane as the outside end in the axial direction x of the tire house 43. Therefore, various sensors mounted on the vehicle 39 can be restrained from wrongly detecting the load motor 1 as an obstacle. It is thus possible to restrain the wrong operation of the vehicle 39 based on the wrong detection by the sensors. It thus becomes possible to perform a highly reliable performance test of the vehicle 39.

By the way, the fact that the load motor 1 can be well accommodated inside the tire house 43 does not only intend to be that the peripheral wall portion 5 and the end wall portion 6 of the load motor 1 be completely accommodated inside the tire house 43. Within a sense that the sensors do not wrongly detect the load motor 1 as an obstacle, the peripheral wall portion 5 and the end wall portion 6 may protrude outside o in the axial direction x beyond the inside of the tire house 43.

In addition, in the load motor 1 according to the first embodiment, the torque sensor 16 is mounted on the rotor frame 11. Therefore, the load motor 1 has been arranged to house therein the torque sensor 16 and, consequently, the torque sensor 16 will not protrude outside in the direction of the vehicle width. As a consequence, the wrong detection by the various sensors that are disposed on the vehicle 39 can further be restrained. It is to be noted here that, as long as the torque sensor 16 can restrain the wrong detection by the various sensors that are disposed on the vehicle 39, it is not always necessary to dispose the torque sensor on the rotor frame 11. The measuring devices to measure the torque may also be disposed as a member that is separate from the load motor 1.

In case the load motor 1 is installed in the tire house 43, the third cover 35 is removed in advance from the end wall portion 6. At the time of installing the load motor 1, a plurality of second through holes 30 lie true opposite, in 1 to 1 relationship, to a plurality of first through holes 14 that are opened in the end wall portion 6 as shown in FIG. 1. Therefore, the second through holes 30 can serve to insert into the inside of the hollow portion 7 of the case 2, the insertion being of bolts and fixing tools for the bolts in the form of a wrench or a screw driver. In this arrangement, by using the wrench or the screw driver, the bolts are inserted into the first through holes 14, screw them into the threaded holes 15 of the brake disc 8a, and the rotor coupling portion 10 can thus be fixed to the drive wheel coupling portion 8 inclusive of the brake disc 8a.

By the way, in case the drive wheel coupling portion 8 to be coupled to the rotor coupling portion 10 is of a wheel hub, the wheel hub has embedded therein with a plurality of bolts on a concentric circle at a predetermined distance from one another. Since the bolts are protruded outside in the width direction of the vehicle, use may be made of the bolts embedded in the wheel hub on the occasion of coupling the rotor coupling portion 10 and the drive wheel coupling portion 8. In this case, into the first through holes 14 that have been opened in the rotor coupling portion 10, the above-mentioned bolts are inserted from the inside i in the axial direction x, so as to be protruded into the hollow portion 7 of the case 2. Accordingly, into the second through holes 30, there are inserted, into the inside of the hollow portion 7 of the case 2, nuts that can be fixed, in a threaded manner, to the above-mentioned bolts and a wrench as a tool for fixing the nuts in a threaded manner. Then, by using the wrench the above-mentioned nuts are threaded onto the above-mentioned bolts, thereby fixing the rotor coupling portion 10 to the drive wheel coupling portion 8.

Further, as shown in FIG. 1 and FIG. 2, in the first embodiment, the peripheral wall portion 5 of the case 2 is provided with a seating 44 at the bottom end thereof. The seating 44 has: a seating surface 45 which can be made, e.g., into an arcuate curved surface and the like, the curved surface of which lying along the peripheral surface of the peripheral wall portion 5; and an installation surface 46 which can be made, e.g., into a flat surface and the like, the installation surface 46 of which being disposed on the surface of installation on which the vehicle 39 is disposed at the time of performance test. By virtue of the seating 44 the state of installation of the load motor 1 can be made stable at the time of the performance test of the vehicle 39 as shown in FIG. 3. Further, the seating 44 can be provided with a damping material on the upper surface portion of the seating surface 45 or on the lower surface portion of the installation surface 46. In this case, the vibrations to be generated accompanied by the rotation of the rotor 4 can be restrained by the above-mentioned damping material, and the vibrations can be restrained from being transmitted to the surface of installation at the time of the performance test of the vehicle 39. These effects can be further enhanced, as shown in FIG. 1 and FIG. 2, by disposing the seating 44, at the time of installing the load motor 1, such that the installation surface 46 is positioned below the lower end of the case 2 so as to be elongated beyond the peripheral wall portion 5. The seating 44 is disposed, in the first embodiment, in one piece each at an outside end portion and inside end portion in the axial direction x of the peripheral wall portion 5 of the case 2.

Figure 5:
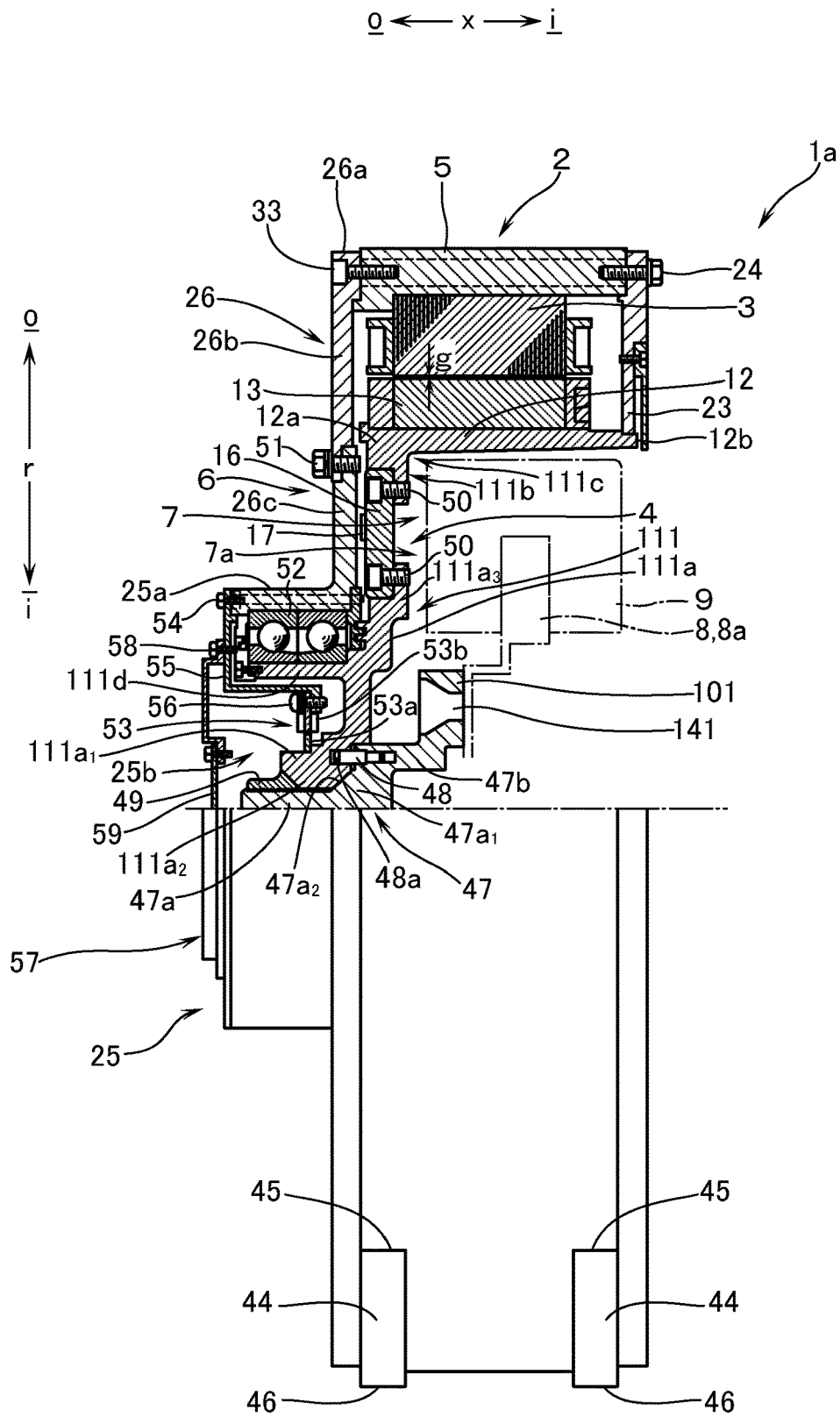
FIG. 5 is a sectional view of an essential part taken from a side, showing a second embodiment of a load motor for a chassis dynamometer apparatus.
Figure 6:
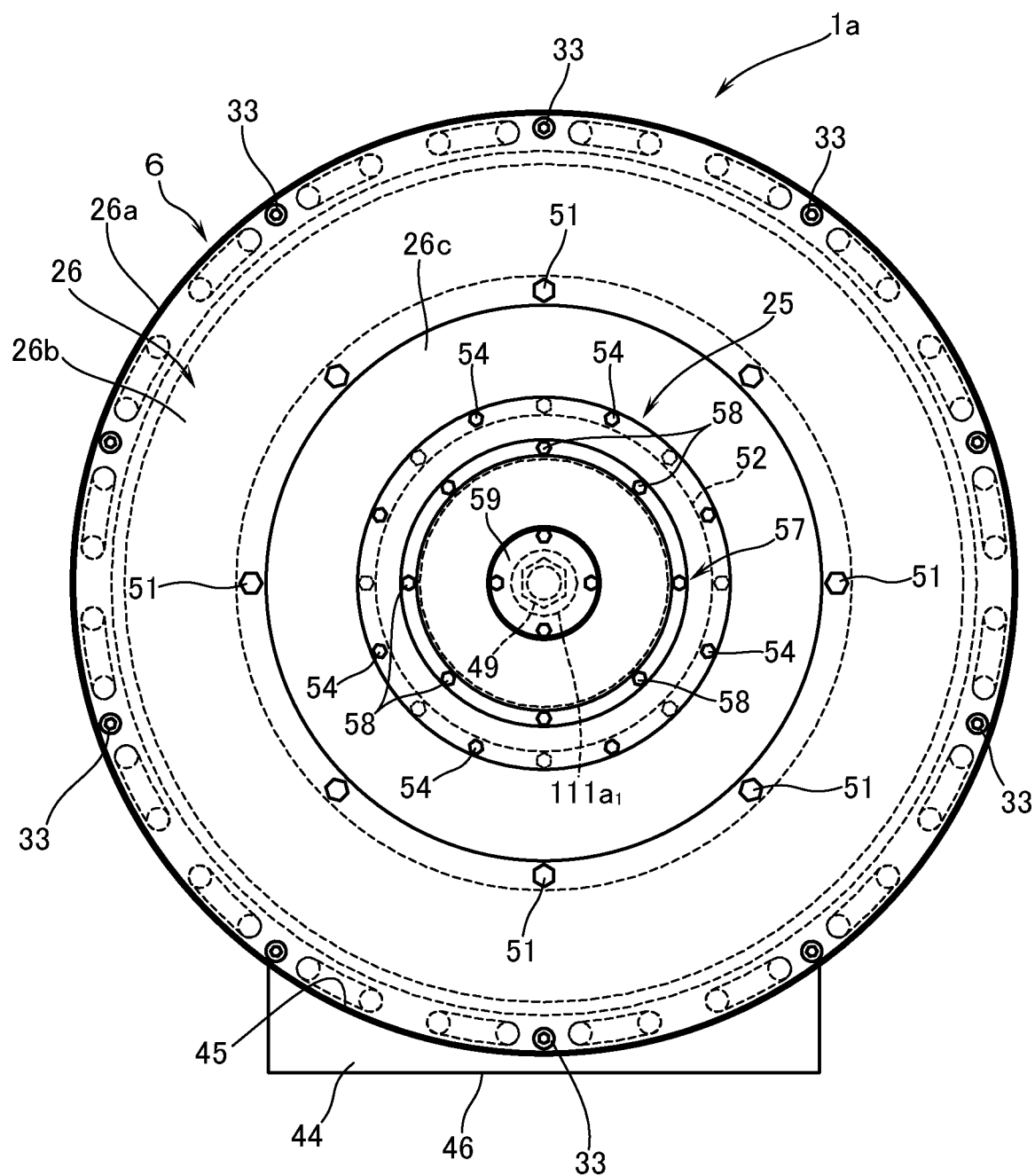
FIG. 6 is a view taken from an axially outside of the second embodiment shown in FIG. 5.

Next, a description will be made, with reference to FIG. 5 and FIG. 6, of a second embodiment of a load motor 1*a* for a chassis dynamometer apparatus (hereinafter simplified as a load motor) of this invention. In the load motor 1*a*, the same reference marks are affixed to the same parts of the load motor 1 shown in FIG. 1 and FIG. 2 and explanations thereof are omitted in the following description.

In the load motor 1*a*, the rotor 4 is provided with an axle member 47 that is a member separate from the rotor frame 111. The axle member 47 has a rotor coupling portion 101 on the inside i as seen in the axial direction x. The rotor frame 111 is coupled to the axle member 47 at the inside end portion 111*a* in the radial direction r. In concrete, the axle member 47 is a member that extends in the axial direction x, and is provided with: a rotor frame fixing portion 47*a* in a columnar shape; and a rotor frame fixing/positioning portion 47*b* in a cylindrical shape. The rotor frame fixing portion 47*a* has formed therein screw threads on an outer circumferential surface starting from an outer end portion in the axial direction x to an intermediate portion. Further, the inside end portion in the axial direction x of the rotor frame fixing portion 47*a* is bent outside o in the radial direction r, and the outside end portion of a bent portion 47*a*$_1$ is bent inside i in the axial direction x, thereby serving the purpose of the rotor frame fixing/positioning portion 47*b*. The rotor frame fixing/positioning portion 47*b* extends inside i in the axial direction x. The outside end surface, as seen in the axial direction x, at the base of the bent portion 47*a*$_1$ of the rotor frame fixing portion 47*a* is partly formed into a conical surface 47*a*$_2$ which diverges outside o in the radial direction r. The rotor frame fixing/positioning portion 47*b* has embedded therein a plurality of pins 48 at a predetermined spacing from one another on a coaxial circle, the pins protruding outside o in the axial direction x. The inside end portion in the axial direction x of the rotor frame fixing/positioning portion 47*b* is bent outside o in the radial direction r and this bent portion serves the purpose of the rotor coupling portion 101. The rotor coupling portion 101 has opened therethrough a plurality of through holes 141 which penetrate in the axial direction x. The through holes 141 are so arranged that the fixing tools such as bolts and the like can be inserted, and are concentrically positioned at a predetermined spacing from one another. In addition, the through holes 141 are capable of lying face to face in one-to-one positional relationship with a plurality of screw holes (not illustrated) that are opened in a penetrating manner in the vehicle width direction at the drive wheel coupling portion 8 such as a brake disc 8*a* and the like. The axle member 47 is coupled to the drive wheel coupling portion 8 by inserting the fixing fittings such as bolts and the like from the through holes 141 of the rotor coupling portion 101 and then screwing them into the above-mentioned screw holes in the drive wheel coupling portion 8.

The rotor frame 111 extends outside in the radial direction r at an outer position in the axial direction x than the brake caliper 9, in a state in which the rotor coupling portion 101 has been coupled to the drive wheel coupling portion 8. In the second embodiment, the rotor frame 111 is provided with: a first upright portion 111*a* that extends outside o in the radial direction r; and a second upright portion 111*b* that is separate from the first upright portion 111*a* and that extends straight outside o in the radial direction r. The inside end portion 111*a* in the radial direction r of the first upright portion 111*a* is bent outside o in the axial direction x and has a projected portion 111*a*$_2$ which projects inside i in the radial direction r. The inside end portion 111*a*$_1$ is provided, in an inside portion in the axial direction x, with a plurality of pin holes 48*a* into which pins 48 can be inserted. Further, both inside circumferential surfaces of inside and outside ends in the axial direction x of the projected portion 111*a*$_2$ are respectively formed into a conical surface which diverges outside o in the radial direction r. On the other hand, the outside end portion 111*a*$_3$ in the radial direction r of the first upright portion 111*a* is bent inside in the axial direction x in such a degree as to be free from contact with the brake caliper 9, thereby forming a flange-shape. In an intermediate portion between the inside end portion 111*a*$_1$ and the outside end portion 111*a*$_2$ of the first upright portion 111*a*, there is disposed a cylindrical tubular axle 111*d* in a manner to project outside o in the axial direction x. The tubular axle 111*d* is formed integrally with the first upright portion 111*a*.

In a manner similar to the load motor 1 of the first embodiment as shown in FIG. 1, the first upright portion 111*a* and the second upright portion 111*b* are coupled together through the torque sensor 16. In other words, the inside end portion in the radial direction r of the second upright portion 111*b* is formed into a flange shape similar to the outside end portion 111*a*$_3$ of the first upright portion 111*a*. The outside end portion 111*a*$_3$ of the first upright portion 111*a* and the inside end portion of the second upright portion 111*b* have respectively formed a plurality of threaded holes that penetrate in the axial direction x. Therefore, the inside end surfaces in the axial direction x at both the inside and the outside end portions in the radial direction r of the torque sensor 16 are brought into contact with the outside end surface in the axial direction x at the outside end portion $111a_3$ of the first upright portion $111a$ and the outside end surface in the axial direction x at the above-mentioned inside end portion of the second upright portion $111b$, and then the bolts 50 are screwed into the above-mentioned threaded holes from the outside o in the axial direction x of the torque sensor 16. As a result, the first upright portion $111a$ and the second upright portion $111b$ are coupled together through the torque sensor 16. By the way, the rotor circumferential wall portion 12 is connected to the outside end in the radial direction r of the second upright portion $111b$ of the rotor frame 111, and extends from the connecting portion $111c$ of the second upright portion $111b$ to the inside i in the axial direction x.

At the time of installing the load motor $1a$, after having coupled the axle member 47 to the drive wheel coupling portion 8 at the rotor coupling portion 101, pins 48 are inserted into the pin holes $48a$ in a state in which the projected portion $111a_1$ is externally fitted onto the rotor frame fixing portion $47a$, the fixing position of the rotor frame 111 is determined. In this state, by screwing the nuts 49 toward the inside i from the outside end in the axial direction x of the rotor frame fixing portion $47a$, the inside end surface in the axial direction x of the projected portion $111a_2$ will come into close contact with the conical surface $47a_2$ of the bent portion $47a_1$ at the rotor frame fixing portion $47a$. By making the inside end in the axial direction x of the nut 49 into a conical surface in which the outer circumferential surface at the inside end in the axial direction x of the nut 49 diverges outside o, the inside end surface in the axial direction x of the nut 49 comes into close contact with the outside end surface in the outside o in the axial direction x at the projected portion $111a_2$. In this manner, the rotor frame 111 is coupled to the axle member 47 at the inside end portion $111a_1$. The rotor 4 becomes capable of rotating together with the drive wheel coupling portion 8. In a state in which the rotor coupling portion 101 is coupled to the drive wheel coupling portion 8, the brake caliper 9 is inserted into the space $7a$ in the inside i of the radial direction r of the rotor circumferential wall portion 12 in the hollow portion 7. Therefore, the distance in the axial direction x from the rotor coupling portion 101 to the end wall portion 6 of the case 2 can be shortened. In a state in which the rotor coupling portion 101 is kept coupled to the drive wheel coupling portion 8 of the vehicle, the end wall portion 6 of the case 2 can be restrained from largely protruding outside of the tire house 43 of the vehicle 39.

Further, in the second embodiment, the second cover 26 which forms a part of the end wall portion 6 of the case 2 is formed by an outside cover portion $26b$ which forms the outside peripheral portion, and an inside cover portion $26c$ which is positioned inside thereof, both being coupled on the same surface. The manner of coupling the outside cover portion $26b$ and the inside cover portion $26c$ is similar to the coupling manner between the second cover 26 and the ring 27 of the load motor 1 of the first embodiment shown in FIG. 1 in which the first counterbored portion and the second counterbored portion are screwed with bolts 51 at the coupling portion through coupling. In addition, the inside end portion in the radial direction r of the inside cover portion $26c$ are bent outside o in the axial direction x so as to form the body portion $25a$ of the rotation support portion 25. The body portion $25a$ is cylindrical in shape and the inside surface of the body portion $25a$ has mounted thereon a bearing 52 of an inner ring rotation system. The cylindrical tubular axle $111d$ of the rotor frame 111 is projected inside i in the radial direction r of the body portion $25a$. A bearing 52 is interposed between the cylindrical tubular axle $111d$ and the body portion $25a$. The bearing 52 is larger in diameter than the bearing 34 in the first embodiment. Therefore, the supporting rigidity of the rotor 2 will be an improvement over the first embodiment.

Furthermore, in the second embodiment, in the rotation support portion 25, the space between the inside end portion $111a$ of the rotor frame 111 and the cylindrical tubular axle $111d$ is hollow and a rotation sensor 53 is housed inside the space $25b$. The rotation sensor 53 is made up of; a magnetic pickup $53a$ which is attached with screws 56 to a mounting bracket 55 that is fixed to an outside end surface in the axial direction x of the body portion $25a$; and a sensor gear $53b$ that is externally fitted onto an inside end portion $111a_1$ at the first upright portion $111a$ of the rotor frame 111. The inside of the rotation support portion 25 inclusive of the rotation sensor 53 is covered with a fourth cover 57 from an outside o in the axial direction x, the fourth cover being attached with screws 58 to the mounting bracket 55. The fourth cover 57 is ring-shaped and the inside thereof has screwed thereto a sub-cover 59 that is dismounted at the time of removing the nut 49.

The protrusion of the rotation support portion 25 of the load motor $1a$ is larger than that of the rotation support portion 25 of the load motor 1 according to the first embodiment. However, this protrusion can still be made smaller than the allowance of outside protrusion when, by operating a steering wheel of the vehicle 39 so as to move the wheel 40 sidewise, the wheel 40 moves out of the tire house 43. It is therefore possible to restrain the wrong detection by the various sensors mounted on the vehicle 39.

Descriptions have so far been made of the first embodiment and the second embodiment of this invention with reference to the drawings, but this invention shall not be limited to the above. Details of the structure of the rotation support portion of the rotor, the arrangement and structure of the drive wheel coupling portion of the rotor, the kinds of the fixing fittings and fixing tools for connecting the rotor coupling portion, and the like and the drive wheel coupling portion may be employed in this invention from the various ones inclusive of known ones.

EXPLANATION OF MARKS

| | |
|---|---|
| 1, 1a | load motor for a chassis dynamometer apparatus |
| 2 | case |
| 3 | stator |
| 4 | rotor |
| 5 | peripheral wall portion |
| 6 | end wall portion |
| 7 | hollow portion |
| 7a | space in the inside of radial direction of the rotor circumferential wall portion |
| 8 | drive wheel coupling portion |
| 8a | brake disc |
| 9 | brake caliper |
| 10, 101 | rotor coupling portion |
| 11, 111 | rotor frame |
| $111a_1$ | inside end portion in the radial direction of the rotor frame |
| 11c, 111c | connecting portion |
| 12 | rotor circumferential wall portion |
| 13 | magnet |
| 16 | torque sensor |
| 39 | vehicle |

| | |
|---|---|
| 43 | tire house |
| 47 | axle member |
| x | axial direction |
| r | radial direction |
| o | outside |
| i | inside |

The invention claimed is:

1. A load motor for a chassis dynamometer apparatus which carries out a performance test of a vehicle, the load motor comprising:
a case having a peripheral wall portion, an end wall portion, and a hollow portion enclosed by the peripheral wall portion and the end wall portion;
a stator fixed to a radially inside surface of the peripheral wall portion; and
a rotor which is housed inside the hollow portion of the case, which is rotatably disposed radially inside the stator, and which can be coupled to a drive wheel coupling portion of the vehicle,
wherein, provided that a vehicle width direction is defined as an axial direction, that an outside of the vehicle width direction is defined as an axial outside, and that an inside of the vehicle width direction is defined as an axial inside, the peripheral wall portion of the case extends in the axial direction; the end wall portion of the case is disposed at an axial outside end of the peripheral wall portion; the case can be inserted from the axial outside into a tire house of the vehicle at the time of mounting in position the load motor for a chassis dynamometer apparatus; and the hollow portion of the case can receive, by insertion thereinto, a brake disc and a brake caliper of the vehicle,
wherein the rotor has:
a rotor coupling portion which can be coupled to the drive wheel coupling portion of the vehicle;
a rotor frame extending radially outside at an axially outer position than the brake caliper in a state in which the rotor coupling portion is coupled to the drive wheel coupling portion;
a rotor circumferential wall portion which is connected to a radially outside end of the rotor frame and which extends axially inside from a connecting portion connected to the radially outside end of the rotor frame; and
a magnet fixed to the rotor circumferential wall portion, and
wherein it is so arranged that the brake caliper is inserted into a space radially inside the rotor circumferential wall portion in a state in which the rotor coupling portion is kept coupled to the drive wheel coupling portion.

2. The load motor for a chassis dynamometer apparatus according to claim 1, wherein the rotor coupling portion is disposed integrally with the rotor frame, and wherein the rotor frame extends from the rotor coupling portion by offsetting axially outside so as to extend radially outside in a manner to detour the brake caliper.

3. The load motor for a chassis dynamometer apparatus according to claim 1, wherein an axle member that is a member separate from the rotor frame is provided with the rotor, and wherein the axle member has a rotor coupling portion axially inside so that the rotor frame is coupled to the axle member at the radially inside end portion of the rotor frame.

4. The load motor for a chassis dynamometer apparatus according to claim 2, wherein a torque sensor is disposed on the rotor frame.

5. The load motor for a chassis dynamometer apparatus according to claim 3, wherein a torque sensor is disposed on the rotor frame.

* * * * *